April 9, 1946.   DE WITT C. STOWE   2,398,124
HYDRAULIC TRANSMISSION
Filed Oct. 23, 1944   2 Sheets-Sheet 1

INVENTOR
De Witt C. Stowe
BY
ATTORNEYS

April 9, 1946.  DE WITT C. STOWE  2,398,124
HYDRAULIC TRANSMISSION
Filed Oct. 23, 1944  2 Sheets-Sheet 2
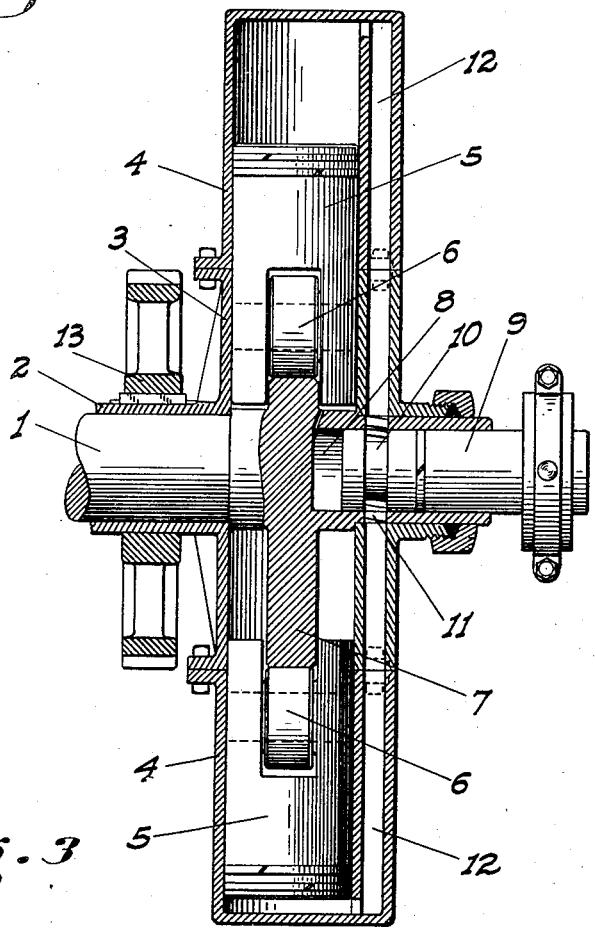
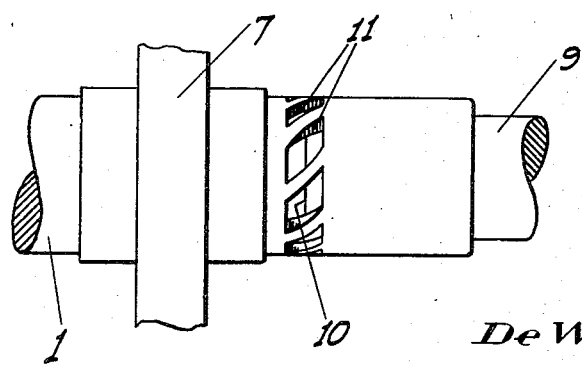
INVENTOR
De Witt C. Stowe
BY
ATTORNEYS Patented Apr. 9, 1946

2,398,124

UNITED STATES PATENT OFFICE 2,398,124

HYDRAULIC TRANSMISSION

De Witt C. Stowe, Stockton, Calif.

Application October 23, 1944, Serial No. 560,021

1 Claim. (Cl. 192—60)

This invention relates to power transmitting devices and particularly to one of that type which uses a fluid as the power transmitting medium between the driving and driven elements of the apparatus.

The principal object of my invention is to provide a mechanism of this character by means of which any desired speed ratio may be obtained between the driving and driven elements, with the use of a minimum amount of fluid, which has an extremely simple fluid and speed control device, and which is so constructed that possible leakage of the fluid and a consequent loss of power is reduced to a minimum.

I have particularly in mind to employ this transmission in connection with tractors and heavy duty trucks to take the place of the usual gear tranmissions. This is because with gearing the machine can only travel at a certain fixed speed with a certain engine speed, and such gearing cannot give a very close selectivity of speeds such as is frequently desirable for economical and efficient operation.

For instance, a tractor pulling a load might have more than enough power to travel at a given speed with a certain setting of the transmission gears, but insufficient power to travel at the greater speed necessitated by the use of another set of gears. The tractor, therefore, cannot operate to a full capacity. With my improved mechanism, on the other hand, the transmission may be set so as to utilize the full power of the tractor and enable a maximum operating speed to be maintained.

A further object of the invention is to provide a simple and inexpensive device, and yet one which will be exceedingly effective for the purpose for which it is designated.

These objects I accomplish by means of such structure and relative arrangement of parts as will fully appear by a perusal of the following specification and claim.

In the drawings similar characters of reference indicate corresponding parts in the several views:

Fig. 2 is a vertical longitudinal section of the same.

Fig. 3 is a fragmentary enlarged view of the ported driving shaft and its control plunger or valve.

Figure 1:
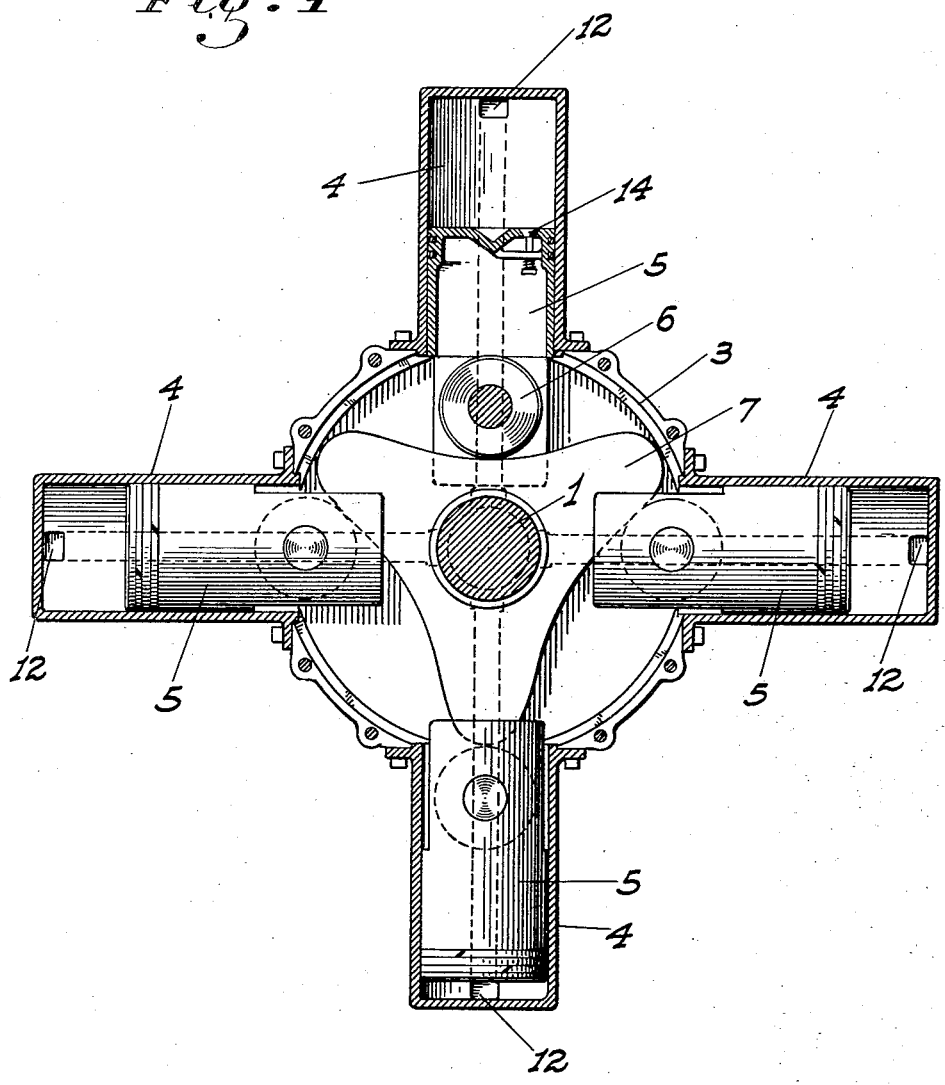
Fig. 1 is a transverse section of my improved transmission.

Referring now more particularly to the characters of reference on the drawings, 1 denotes a drive shaft adapted to be connected to a propeller shaft or the like, and on which is turnably mounted a hub 2 which is formed integral with the housing 3. Fixed on and projecting outwardly from the housing radial with the shaft are a plurality of cylinders 4. These cylinders are closed on their outer ends and are preferably arranged as diametrically opposed pairs. Pistons 5 are slidable in the cylinders and on their inner ends carry rollers 6 which ride on the periphery of a star-shaped cam 7 which is fixed on or formed with the shaft 1 inside the housing. The contour of the cam relative to the pistons is such that the opposed pistons move in opposite directions, and is also preferably such that one pair of opposed pistons are at the opposite ends of their stroke, while the other pair are then disposed centrally of the ends of the stroke while moving in opposite directions. In this manner an even flow of power may be imparted to the shaft and cam with the rotation of the housing.

The end of the shaft opposite the hub 2 is bored out as at 8 for a certain distance to slidably and turnably receive a manually controlled plunger valve 9. This valve has a close running fit with the bore except for a circumferential groove 10 which is cut in the valve near its inner end. This groove is adapted to register with a row of circumferentially spaced and diagonally cut ports 11 in the shaft which are the same width as said groove. These ports are in constant communication with the adjacent ends of passages 12 which extend radially of the shaft to the outer ends of the different cylinders with which they communicate as shown. A pinion 13 adapted to mesh with a gear of any suitable size is fixed on the hub 2, so that the driving connection with an engine may be made.

In operation the cylinders outwardly of the pistons as well as the passages 12 are completely filled with a suitable fluid. If the valve 9 is positioned so that the groove 10 fully registers with the ports 11, rotation of the housing merely reciprocates the pistons without imparting rotation to the shaft. This is because the fluid may then freely pass from one to the other of the cylinders through the wide open ports, the total area of which is not less than the combined area of the passages 12 where they communicate with the cylinders. If, however, the plunger is advanced in the shaft bore so as to shut off the ports somewhat, a resistance to the free flow and bypassing of the fluid is had. The pistons are therefore restrained in their reciprocating movement and as a result rotation is imparted to the cam and shaft. The speed of such rotation relative to that of the housing will bear a certain definite relation to the extent to which the ports are closed. If the ports are entirely closed so that no fluid can pass from one cylinder to the other, the pistons can have no movement and the shaft and housing will turn at the same speed.

To relieve any excessive pressure which may possibly develop in the housing by reason of leakage of fluid into the same, the pistons are preferably provided with outwardly opening check valves 14 in their heads as shown in Fig. 1.

While oil is usually employed as the operating fluid in transmissions of this character, I do not wish to limit myself to the use of this liquid, since other liquids or fluids may also possibly be employed with equally effective results.

By reason of the fact that the relatively heavy housing, with its associated parts, is the driving member of the structure, the weight of these parts serves as a fly wheel, aiding in obtaining a smoothness of operation.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A hydraulic transmission mechanism which includes a housing comprising opposed cylinders, pistons operable in said cylinders, the housing being provided with a passageway adjacent each cylinder and opening into the outer ends of the cylinders, the longitudinal axes of said passageways adjacent opposed cylinders being in line and intersecting the transverse central axis of the housing, a bearing on each side face of the housing about said central axis thereof, a driven shaft projecting through said housing and supported in said bearings, a central bore in said shaft at one end thereof, the axis of said bore intersecting the axes of said passageways and the wall of the shaft about said bore being provided with ports in communication with said passageways, a slide valve in the bore operable to open and close communication through said passageways through said ports, means mounting said pistons in driving relation with the driven shaft and means to impart rotary motion to the housing.

DE WITT C. STOWE.